United States Patent
Chang et al.

(10) Patent No.: US 6,388,615 B1
(45) Date of Patent: May 14, 2002

(54) MICRO CELL ARCHITECTURE FOR MOBILE USER TRACKING COMMUNICATION SYSTEM

(75) Inventors: Donald C. D. Chang, Thousand Oaks; Ying Feria, Manhattan Beach; Weizheng Wang, Rancho Palos Verdes; Alan Cha, Glendale; Ming Chang, Rancho Palos Verdes; Frank A. Hagen, Palos Verdes Estates; Kar W. Yung, Torrance, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/587,758

(22) Filed: Jun. 6, 2000

(51) Int. Cl.[7] .................................................. H01Q 3/22
(52) U.S. Cl. ........................................ 342/368; 342/354
(58) Field of Search ................................. 342/154, 157, 342/354, 368, 357.06; 455/456

(56) References Cited

U.S. PATENT DOCUMENTS

| | | | | |
|---|---|---|---|---|
| 4,979,170 A | * | 12/1990 | Gilhousen et al. ....... | 370/104.1 |
| 5,572,216 A | * | 11/1996 | Weinberg et al. ............ | 342/357 |
| 5,612,701 A | * | 3/1997 | Diekelman .................. | 342/354 |
| 5,790,070 A | * | 8/1998 | Natarajan et al. ........... | 342/354 |
| 5,856,804 A | * | 1/1999 | Turcotte et al. ............. | 342/371 |
| 5,903,549 A | * | 5/1999 | Von Der Embse et al. . | 370/310 |
| 5,949,766 A | | 9/1999 | Ibanez-Meier et al. ..... | 370/316 |
| 6,111,542 A | * | 8/2000 | Day et al. ................... | 342/359 |
| 6,151,308 A | * | 11/2000 | Ibanez-Meier et al. ..... | 370/316 |

OTHER PUBLICATIONS

U.S. application No. 09/271,997, Chang et al., filed Mar. 18, 1999.
U.S. application No. 09/539,964, Rosen et al., filed Mar. 31, 2000.
U.S. application No. 09/721,854, Rosen et al., filed Nov. 22, 2000.
U.S. application No. 09/550,505, Chang et al., filed Apr. 17, 2000.
U.S. application No. 09/566,759, Novak et al., filed May 5, 2000.

(List continued on next page.)

Primary Examiner—Dao Phan
(74) Attorney, Agent, or Firm—Vijayalakshmi D. Duraiswamy; Michael W. Sales

(57) ABSTRACT

A system and method for tracking a user. The system is adapted for use in a wireless communication system and creates a plurality of beams within a coverage area. A first beam is directed at a user in a first microcell and a number of additional beams illuminate microcells immediately adjacent the first microcell. The system is equipped with a mechanism for detecting movement of the user from the first microcell to one of the immediately adjacent microcells. On the detection of movement of the user, the system redirects the first beam from the first microcell to a second microcell, the second microcell being one of the adjacent microcells. In the illustrative embodiment, the system is implemented in a stratospheric platform based communication system including a hub adapted to communicate with a stratospheric platform. A transceiver and a phased array antenna are disposed on the platform to communicate with the hub and with the user. A second antenna is provided on the platform to communicate with the hub. Beamforming and direction are implemented on the hub and communicated to the platform. The user's position is detected with a global positioning system receiver, by measuring the strength of a signal received from the user, or by other suitable means. On detection of user movement from the first microcell, the beamforming system redirects the beam to follow the user into a second microcell. Additional beams around the user's microcell are illuminated to facilitate detection of the users movement.

13 Claims, 12 Drawing Sheets

OTHER PUBLICATIONS

U.S. application No. 09/735,861, Feria et al., filed Dec. 12, 2000.
U.S. application No. 09/611,753, Chang et al., filed Jul. 7, 2000.
U.S. application No. 09/588,395, Chang et al., filed Jun. 6, 2000.
U.S. application No. 09/669,095, Yung et al., filed Sep. 25, 2000.
U.S. application No. 09/661,726, Feria et al., filed Sep. 14, 2000.

K. K. Chan, et al., "A Circularly Polarized Waveguide Array for Leo Satellite Communications", Antennas and Propagation Society, 1999, IEEE International Symposium, vol. 1, Jul. 11–16, 1999, pp. 154–157.
M. Oodo, et al, "Onboard DBF Antenna for Stratospheric Platform", 2000 IEEE International Conference on Phased Array Systems and Technology, Proceedings, May 21–25, 2000, pp. 125–128.
Yokosuka Research Park, "The First Stratospheric Platform Systems Workshop", May 12–13, 1999, pp. 1–216.

* cited by examiner 20-dB CONTOUR 20-dB CONTOUR

MICRO CELL ARCHITECTURE FOR MOBILE USER TRACKING COMMUNICATION SYSTEM

BACKGROUND OF THE INVENTION

1. Field of the Invention

The present invention relates to communications systems. More specifically, the present invention relates to architectures for data/voice services to mobile users, using stratospheric platforms.

2. Description of the Related Art

Stratospheric platforms are being considered for data/voice communication applications. Current proposals envision a mounting of transceivers and antennas on aircraft flying at 20–30 kilometers above the earth which will project beams to cell sites located on the ground.

Copending U.S. patent application Ser. No. 09/588,395, filed Jun. 6, 2000 by D. Chang et al., entitled STRATOSPHERIC PLATFORM BASED MOBILE COMMUNICATIONS ARCHITECTURE, the teachings of which are incorporated herein by reference, addressed the need in the art for a stratospheric platform based communication system offering maximum throughput with the constraints of weight, power and spectrum. In accordance with the teaching of the referenced patent application, communication between users and external networks is facilitated through stratospheric platform and a hub located on the ground. Beamforming is performed at the hub. Signals to and from the user are communicated via directional beams through a phased array antenna on the platform under the directional control of the hub.

Although this system offers a promising solution to the need in the art for a stratospheric platform based communication system and method for projecting beams of varying cell structure to maximize system capacity within the weight, power and bandwidth constraints thereof and thereby optimize the projection of beams with adequate link margin for billable voice and data transmissions, a further need exists in the art for a system and method for tracking the position or location of a user.

For certain applications, the ability to track the position or location of the user would allow for more relaxed platform stability requirements and thereby lower the overall costs of the system. One such application is that of the 'third generation mobile' communications system. As a stratospheric platform application (SPA) this system would provide high data rate communications to a user enabling simultaneous voice, data and entertainment communication. For a lightweight platform payload, both the transmit power and the antenna aperture can be limited. To close a communication link, a larger aperture is needed for the receive end onboard the platform and a larger aperture and more powerful high power amplifiers are needed for the transmit end as well. These requirements are in direct conflict with the objective of a lightweight payload. With beams tracking the mobile users so that the users are always at the antenna peak directivity or within a contour of 1-dB from the peak, the link would have a 3 to 4 dB advantage over the fixed beams.

In addition, since beams would be tracking users, there would be no need to form beams where no users are present except for a new acquisition beam that may scan or a big beam that may be used to zoom in. This arrangement may also save beam forming computations depending on the distribution of users.

In addition, when beams are formed around each user, there may be more opportunities to reuse either the code division multiple access (CDMA) codes or the carrier frequency thereof. This would result in higher system capacity for a limited spectrum.

Knowledge of the user location would also allow for fewer CDMA code handoffs. In a fixed-cell-structure system, when a user crosses a boundary of two cells, CDMA code handoff must happen to avoid interference. With a beam following a user scheme, the user would not have to change his CDMA code unless he gets too close to another user who is using the same CDMA code. A code assignment algorithm is a subject of a copending U.S. patent application Ser. No. 09/735,861 entitled DYNAMIC CELL CDMA CODE ASSIGNMENT SYSTEM AND METHOD filed Dec. 12, 2000, by Ying Feria et al.

SUMMARY OF THE INVENTION

The need in the art is addressed by the system and method for user tracking of the present invention. The inventive system is adapted for use in a wireless communication system and creates a plurality of beams within a coverage area. A first beam is directed at a user in a first microcell and a number of additional beams illuminate microcells immediately adjacent the first microcell. The system is equipped with a mechanism for detecting movement of the user from the first microcell to one of the immediately adjacent microcells. On the detection of movement of the user, the system redirects the first beam from the first microcell to a second microcell, the second microcell being one of the adjacent microcells.

In the illustrative embodiment, the system is implemented in a stratospheric platform based communication system including a hub adapted to communicate with a stratospheric platform. A transceiver and a phased array antenna are disposed on the platform to communicate with the hub and with the user. A second antenna is provided on the platform to communicate with the hub. Beamforming and direction are implemented on the hub and communicated to the platform. The user's position is detected with a global positioning system receiver, by measuring the strength of a signal received from the user, or by other suitable means. On detection of user movement from the first microcell, the beamforming system redirects the beam to follow the user into a second microcell. Additional beams around the user's microcell are illuminated to facilitate detection of the users movement.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
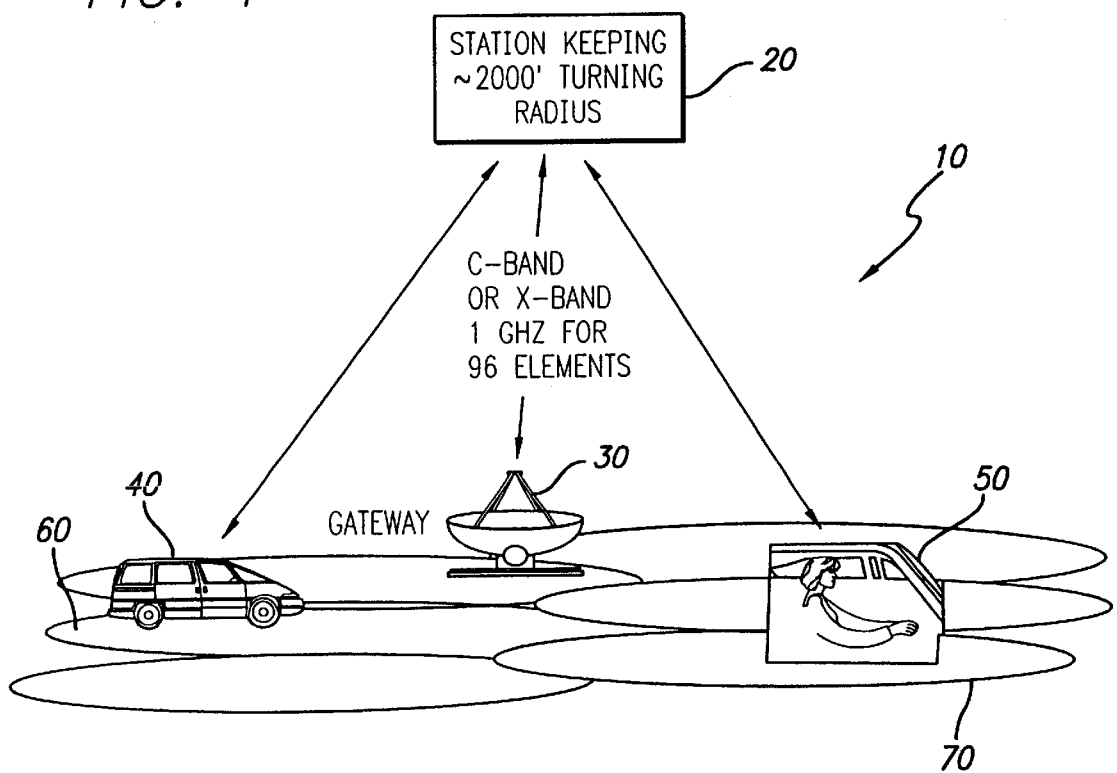
FIG. 1 is a diagram illustrative of the stratospheric communication system of the present invention with a single stratospheric platform.

FIG. 1 is a diagram illustrative of the stratospheric communication system of the present invention with a single stratospheric platform. The inventive system 10 includes a transceiver system 20 mounted on an airborne platform (not shown). In practice, the platform could be an airplane flying in an orbit at 20–30 kilometers (km) above the ground. Those skilled in the art will appreciate that this altitude is 2 to 3 times that of commercial aircraft (i.e., 10 km) and much lower than the altitude of a low earth orbit satellite (1000 km). The transceiver 20 is adapted to communicate with a hub 30 and a plurality of users 40 and 50 located on cells 60 and 70, respectively, on the earth's surface. This system is described and claimed in copending application entitled STRATOSPHERIC PLATFORM BASED MOBILE COMMUNICATIONS ARCHITECTURE, Ser. No. 09/588,395, filed Jun. 6, 2000, by D. Chang et al., the teachings of which are already incorporated herein by reference.

Figure 2:
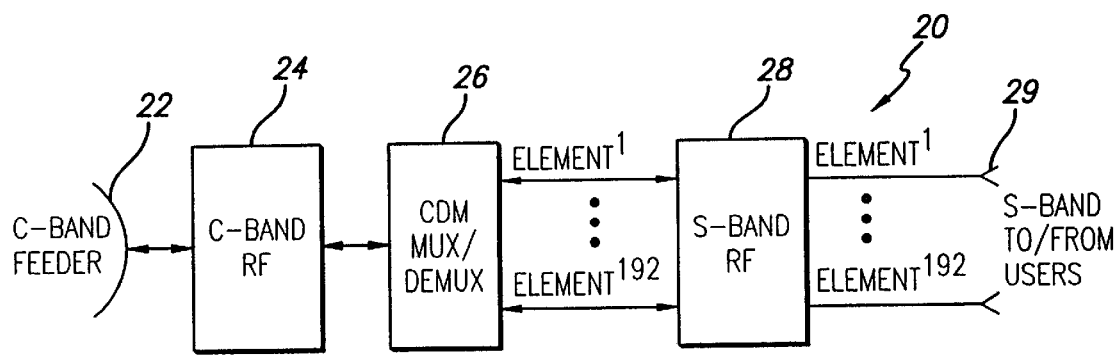
FIG. 2 is a simplified block diagram of the airborne platform based transceiver system implemented in accordance with the present teachings.

FIG. 2 is a simplified block diagram of the airborne platform based transceiver system implemented in accordance with the present teachings. The system 20 includes a feeder antenna 22 adapted to receive a signal from the hub system 30. The feeder antenna at C, X or other suitable frequency band. The antenna 20 is connected to a radio frequency (RF) downconverter circuit 24. The downconverter 24 is adapted to downconvert signals received by the antenna. Hence, a C band antenna would be coupled to a C-band RF downconverter 24. The downconverter 24 outputs a signal at baseband which is demultiplexed by a code division multiplexer 26 into plural separate signals of which 192 are shown in the figure. The multiplexer 26 is bi-directional and serves to multiplex plural signals into a single signal when the system 20 is operating as a receiver. Those skilled in the art will appreciate that the system shown in FIG. 2 is intended for illustration only. Accordingly, the present teachings are not limited to the number of channels or elements shown. Nor is the system limited to the specific circuit configuration shown. Other circuit configurations may be used without departing from the scope of the present teachings.

The demultiplexed signals feed an RF upconverter 28. In the illustrative embodiment, the upconverter 28 operates at S-band. The upconverter drives a phased array antenna 29. As discussed more fully below, the antenna 29 is a single aperture antenna that transmits and receives multiple output beams. The beams are formed and steered by a beamforming network located on the surface in the hub system 30. Each beam creates a footprint on the surface that provides a cell such as the cells shown at 60 and 70 in FIG. 1.

As discussed more fully below, the present invention allows the cell size to be non-uniform. That is, at center of coverage, or nadir, the cell can be smaller. As the scan angle increases, the cell sizes increase. The invention allows for a very light weight payload design and full utilization of the resources that a light-weight payload can offer. The present invention forms beams where there are users present with beams of shapes and sizes that are not necessarily uniform. One or more wider beams are formed to provide links supporting lower data rates. These lower data rate links are used to pick up new users trying to get on the system. This allows the coverage area to be greater with limited receiving beams. In addition, by allowing the beam size to be smaller at the center of coverage (nadir of the platform), the code or frequency reuse distance can be reduced, therefore enhancing the total system capacity.

Figure 3:
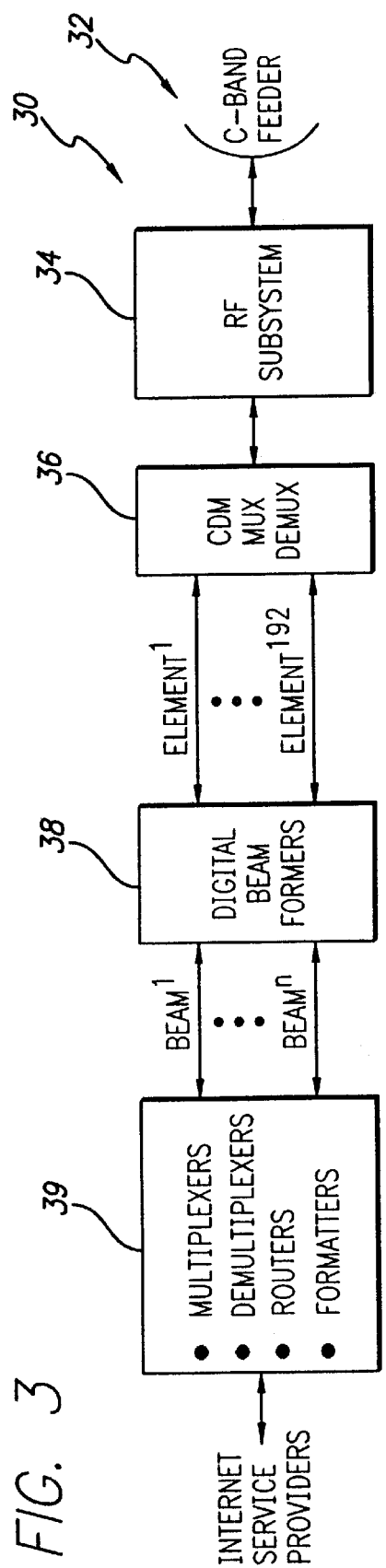
FIG. 3 is a simplified block diagram of a hub in accordance with the teachings of the present invention.

FIG. 3 is a simplified block diagram of a hub in accordance with the teachings of the present invention. The hub transceiver system 30 includes an antenna 32 adapted to communicate with the antenna 22 on the airborne platform. The antenna 32 connects to an RF subsystem 34 which provides upconversion and downconversion in a conventional manner. The subsystem 34 receives a baseband signal from a code division multiplexer/demultiplexer 36. The multiplexer 36 receives inputs from a digital beam former 38 which is fed by conventional multiplexers/demultiplexers, routers, and formatters 39. The multiplexers/demultiplexers, routers, and formatters 39 are connected to an external network such as the Internet or World Wide Web.

The systems depicted in FIGS. 2 and 3 may be implemented in accordance with the teachings of U.S. Pat. No. 5,903,549, issued May 11, 1999 to Von Der Embse and entitled Ground Based Beam Forming Utilizing Synchronized CDMA, the teachings of which are hereby incorporated by reference herein. The number of beams (or simultaneous users) 'n' is scaleable at the gateway.

In accordance with the present teachings, the beam forming circuit 38 generates phasings, weightings and codes for each of a plurality of beams. These beams are multiplexed into a single stream which is transmitted up to the airborne platform 20 via the link provided by the feeders 22 and 32 of FIGS. 2 and 3 respectively. When the stream is received on the airborne platform, it is demultiplexed into separate feeds for the array antenna 29. The phasing and weighting of the signals provided by the beamforming circuit 38 are effective to generate the plural beams and to steer each beam in a desired direction.

FIGS. 4–8 illustrate the operation of the present invention with respect to forward processing, i.e., from the external network to a user, and return processing, from the user to the external network.

Figure 4:
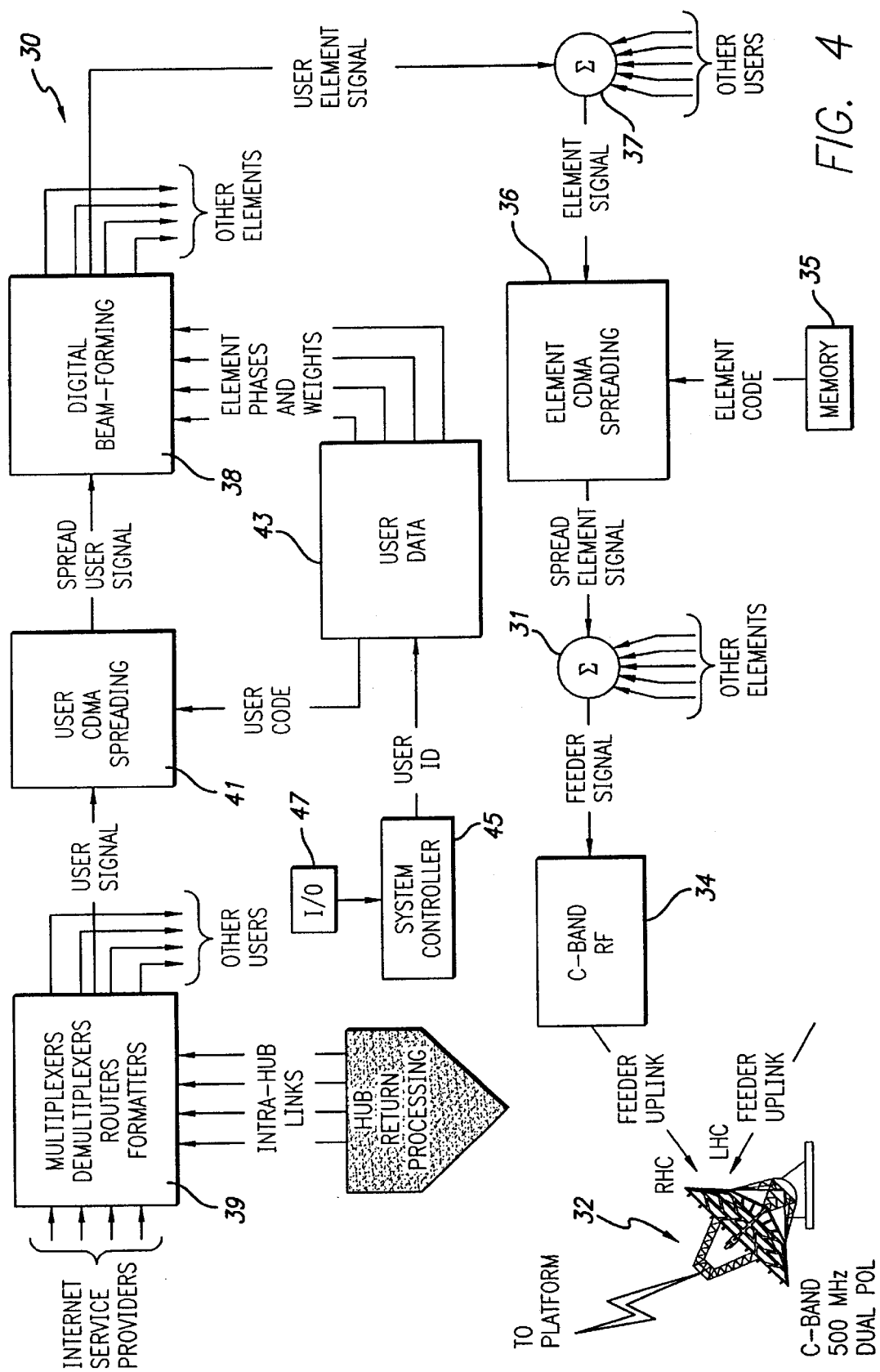
FIG. 4 is a functional block diagram illustrative of the forward processing of the hub in accordance with the present teachings.

FIG. 4 is a functional block diagram illustrative of the forward processing of the hub in accordance with the present teachings. In the illustrative embodiment of the hub processing system 30, user data is received from one or more Internet Service Providers (ISPs) and directed to circuitry associated with each user by a multiplexer 39. FIGS. 4–8 have been simplified to show circuitry associated with a single user. It will be understood that data directed to each user will be processed in a manner similar to that depicted in FIGS. 4–8.

Returning to FIG. 4, the multiplexer 39 is adapted to process signals returning to the hub 30 as discussed more fully below. The signal for a single user is selected by the multiplexer 39 and directed to a code division multiple access (CDMA) encoder/decoder 41. While the encoder/decoder may be implemented in software, in the illustrative embodiment, the encoder/decoder 41 is a digital signal processor which employs a well-known CDMA coding scheme such as an orthogonal (Walsh) code, Gold code and/or Viterbi code to spread the incoming data with a user code. This increases the bandwidth of the incoming signal and allows for a superimposition of signals without interference. The user code is supplied by a dynamic database 43 which performs a lookup of a user code in response to the input of a user ID. The user ID may be supplied by a system controller 45 which performs numerous housekeeping functions in response to input from a system manager interface 47. For example, the controller 45 is programmed to initialize new users and set up the links therefor. In addition, in accordance with the present teachings, the controller 45 is programmed to recognize conflicts and reallocate codes for certain users as necessary in the manner discussed more fully below.

A spread user signal is output by the encoder/decoder 41 to a digital beam former 38. The beam former 38 is a conventional beam forming system which provides element phasing information to direct a beam containing the spread user signal and amplitude information to shape each beam for each user. These beam formed user signals are summed by an adder 37 and input to a CDMA antenna element spreading encoder 36. In the illustrative embodiment, the element spreading encoder 36 uses orthogonal codes to spread the signal for each element in response to an element code supplied by a register or memory 35. The user signals might be on the order of 144 kilobits per second bandwidth, spread to 5 megahertz by the encoder 41, and spread further to 0.5 to 1 gigahertz by the element spreading encoder 36. The signals from the elements are summed by a second adder 31 and input to the radio frequency stage 34. In the illustrative embodiment, the RF stage is an RF transceiver which outputs a right-hand circular (RHC) signal in the C-band or X-band range. In practice, a second identical circuit 30' (not shown) would output a left-hand circular (LHC) signal as well. These signals are combined at the antenna 32 and uplinked to the platform 20 depicted in FIG. 1.

Figure 5:
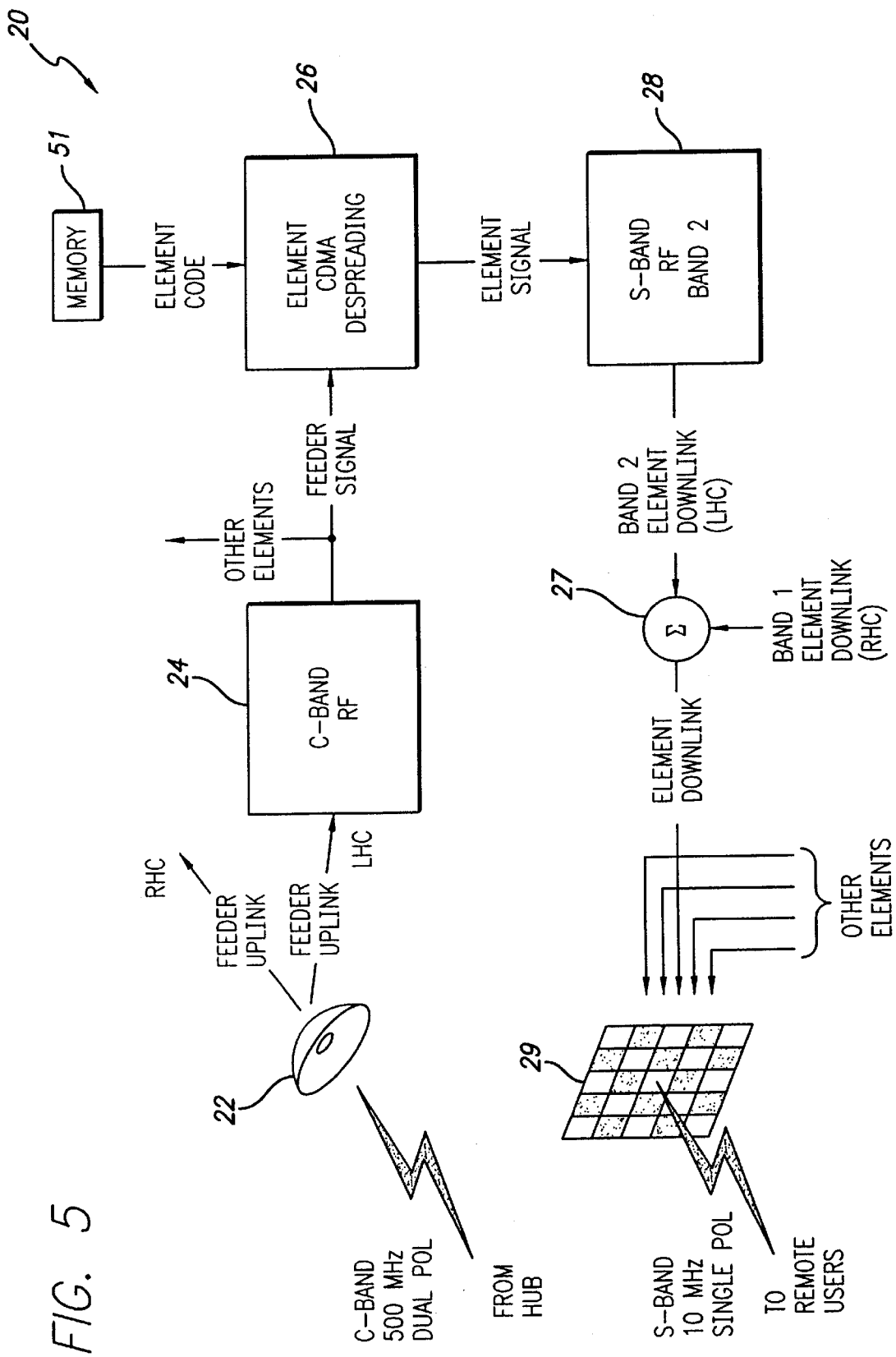
FIG. 5 is a functional block diagram illustrative of the forward processing of the platform in accordance with the present teachings.
Figure 6:
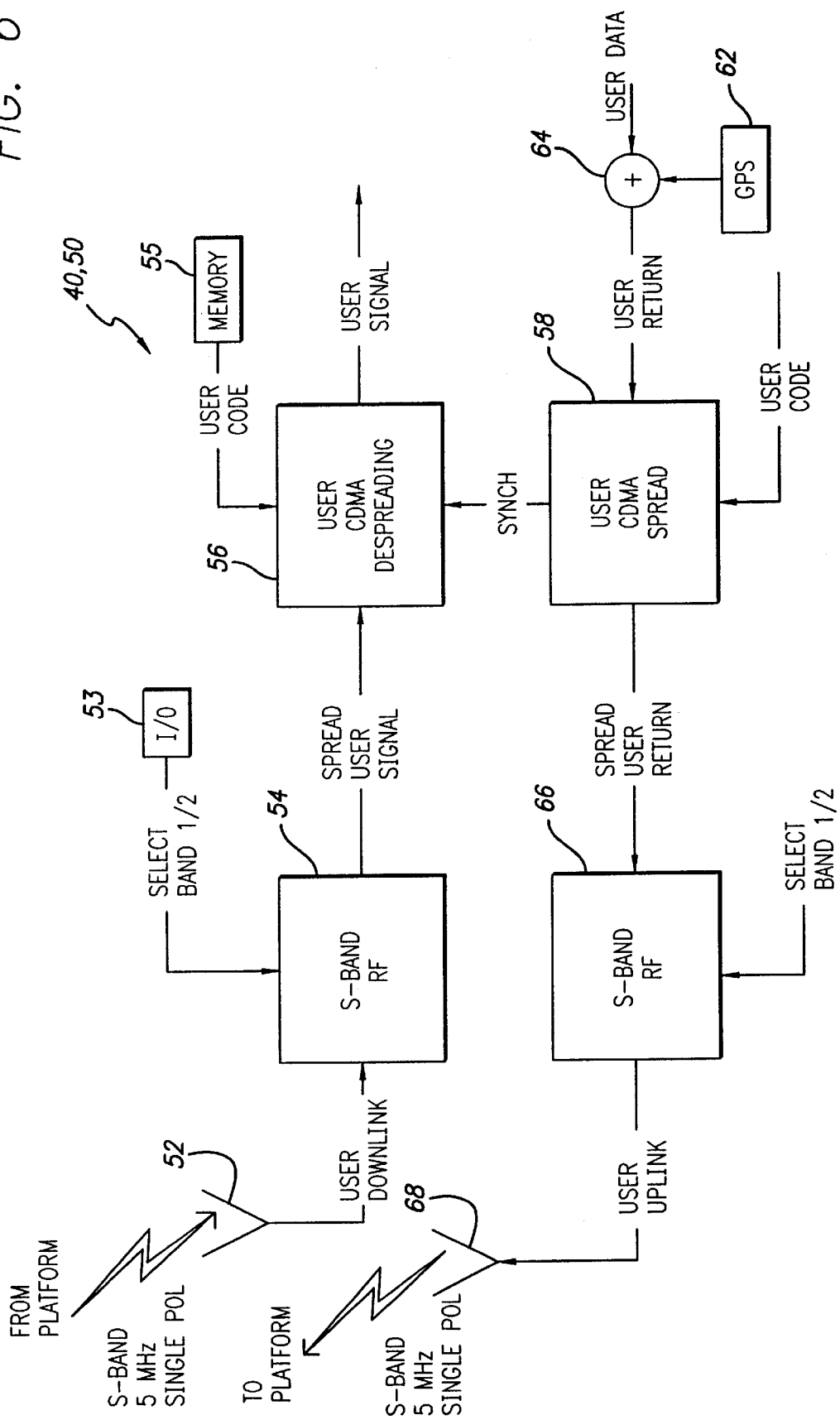
FIG. 6 is a functional block diagram illustrating the processing at the user location in accordance with the teachings of the present invention.

FIG. 5 is a functional block diagram illustrative of the forward processing of the platform in accordance with the present teachings. As shown in FIG. 5, the uplinked signal is received by a feeder antenna 22 and fed to LHC and RHC processing circuits 20 and 20' of which only the LHC circuit 20 is shown. Each processing circuit 20 includes an RF transceiver 24 which downconverts the (C-band) uplink feed of one polarization and outputs feeder signals for each antenna element. The element signals are despread by an element decoder 26 in accordance with a code stored in a memory 51 associated with each element. A signal for a given element is upconverted to S-band, in the illustrative embodiment, and combined with the corresponding signal output by the processing circuit 20' for the RHC by a summer 27 which outputs an element downlink signal to a phased array antenna 29. The phased array antenna 29 forms one or more beams in response to the phasings and weights originally impressed on the element downlink signal by the hub-based beam forming processor 38 of FIG. 4. The beams are thereby directed to an associated user. FIG. 6 is a functional block diagram illustrating the processing at the user location in accordance with the teachings of the present invention. The signal transmitted by the platform is received by an antenna. 52 and downconverted into first and second bands by an S-band RF transceiver 54. One band is selected by the user via an interface 53. The selected signal is despread by a CDMA decoder 56 which is adapted to decode the signal in accordance with the encoding scheme employed by the encoder 41 of FIG. 4. The decoder 56 outputs a user signal in response to a user code supplied by a memory 55.

The return path processing begins with user data being supplied to a summer 64 which combines the user data with location data supplied by a conventional global positioning system (GPS) receiver 62. The combined signal is spread by a CDMA encoder 58, which, in the illustrative embodiment, is designed to operate in accordance with the encoding scheme employed by the encoder 41 of FIG. 4. The encoded signal for the selected band is upconverted (to S-band in the illustrative embodiment) and transmitted to the platform 20 via an antenna 68.

Figure 7:
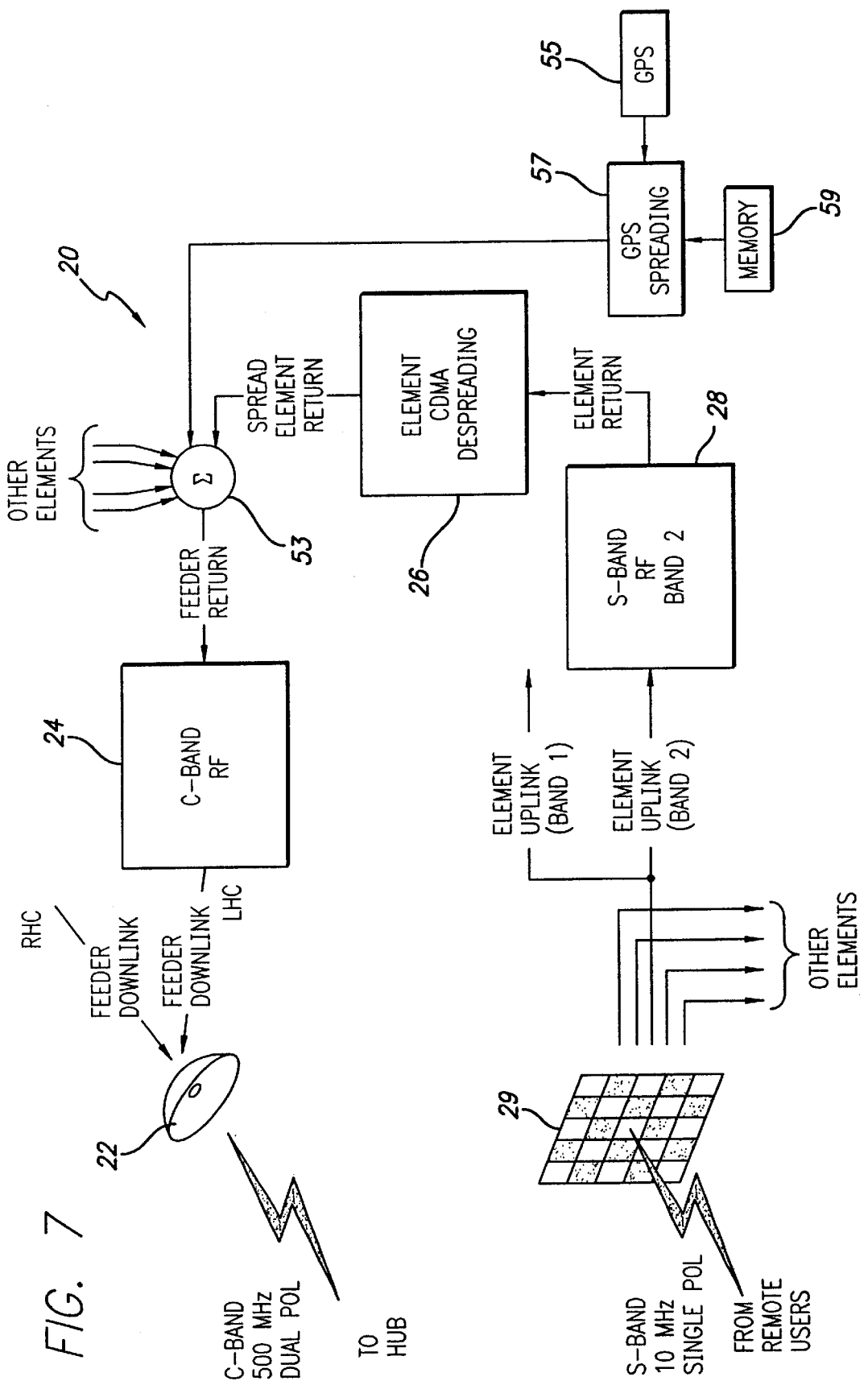
FIG. 7 is a functional block diagram illustrating the return path processing performed on the platform in accordance with the teachings of the present invention.

FIG. 7 is a functional block diagram illustrating the return path processing performed on the platform in accordance with the teachings of the present invention. The signal from the user is received by the phased array antenna 29 and downconverted by the RF transceiver 28. The transceiver 28 outputs an element return signal to an encoder 26. The encoder 26 spreads the signal to avoid interference with the uplink signal and outputs a spread element return signal. The spread element return signal is combined with platform location data supplied by another conventional GPS receiver 55 which is spread by an encoder 56 in response to a code stored in a memory 59. The spread element return signal and the spread GPS location data are combined with corresponding signals from other elements by a summer 53 and upconverted to C-band before being downlinked to the hub 30 via the antenna 22.

Figure 8:
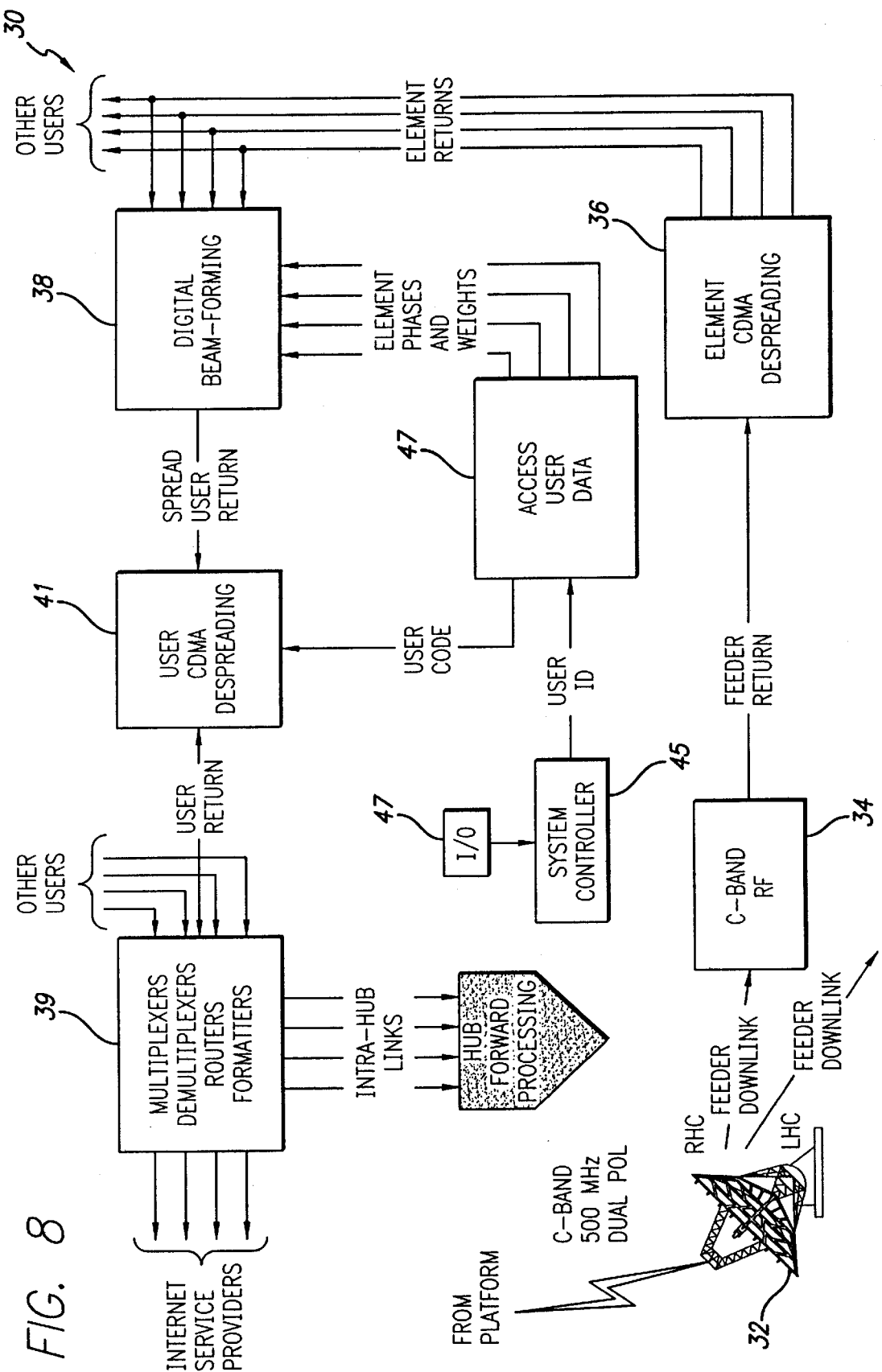
FIG. 8 is a functional block diagram illustrating return path processing at the hub in accordance with the teachings of the present invention.

FIG. 8 is a functional block diagram illustrating return path processing at the hub. in accordance with the teachings of the present invention. The signal downlinked from the platform is received by the antenna 32 and separated into RHC and LHC downlink feeds. Each feed is downconverted to IF by the C-band RF transceiver 34. The downconverted signal is despread by the CDMA decoder 36. The element returns for each user are processed by the beamforming processor 38 in response to the stored phases and weights supplied by the database 47. The spread user data is then supplied to the CDMA decoder 41 which decodes the data in response to a user code supplied by the database 47. The decoder 41 outputs user data suitable for transmission over the network connected to the multiplexer 39.

In the preferred embodiment, each beam is assigned to a user or a zone. If assigned to a user, the beam is adapted to move with the user to minimize the number of code handovers and to increase antenna directivity in user links. Static beams are formed where no user tracking beams are present for new user detection.

Conventionally, the beams radiated by the antenna 29 of FIG. 2, would be constrained to provided fixed, uniform footprints or cells on the ground. If the user distribution is uniform, the equal sized cell structure is optimal. However, equal cell size comes at some cost in hardware. To avoid the need for a mechanical tracking system on the antennas, which can be costly and unreliable, the antennas are phased arrays of radiating elements and steered electronically. At a certain altitude from the ground, where a payload carrying platform locates, a same-sized ground projection cells require smaller angular beams as the scan angle increases. To form smaller beams, more antenna array elements will be needed. For a lightweight payload, the number of elements may be limited, thus forming smaller beams at the edge of the coverage may be costly.

However, in accordance with the present teachings, the beams are formed without regard to a fixed uniform pattern by the digital beam forming network 38. The system 10 is designed to cover a service area with as many users as possible. If the cell size is uniform on the ground, then the required number of elements in the phased array antenna would be so high that a light-weight payload would not be possible. On the other hand, if some elements are not being utilized to form wider beams at the center of the coverage (or nadir of the platform), the resource (frequency or code) reuse distance would be longer. This would result in fewer users on the system and lower total system capacity.

Consequently, the system 10 of the present invention is designed with a dynamic cell structure utilizing all the resources available on a light-weight payload to form beams as small as possible and reuse the frequency or CDMA code as often as possible to enhance the total system capacity. That is, the system 10 allows the cell sizes to be non-uniform. At center of coverage, or nadir, the cell can be smaller. As the scan angle increases, so does the cell size. In addition, the cell shape is not restricted to be perfectly circular. The cell shape may be elongated as the scan angle increases. This is depicted in FIG. 9 below.

Figure 9:
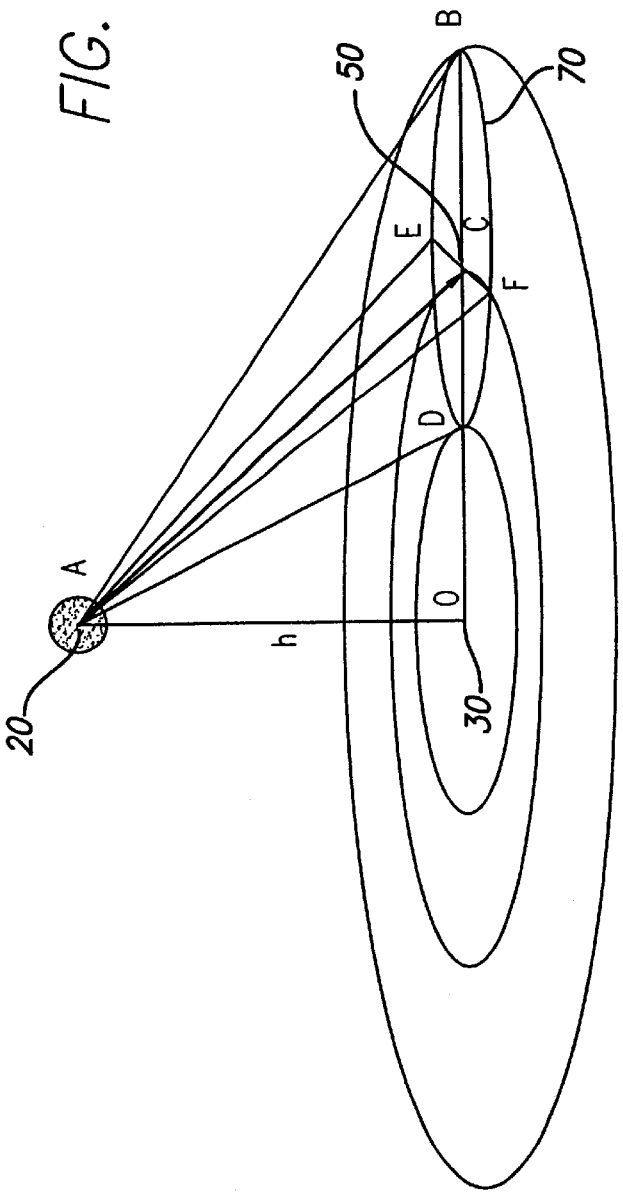
FIG. 9 is a diagram which shows how nonuniform cells are created with a fixed platform antenna aperture.

FIG. 9 is a diagram which shows how nonuniform cells are created with a fixed platform antenna aperture. The scenario illustrated in this figure assumes a nominally circular antenna array situated at 'A' and oriented normal to the local vertical. The antenna is at an altitude 'h' above the ground point 'O', which is at the center of the coverage area, Now consider the beam formed by this antenna having maximum directivity in the direction of a user located at point 'C'. Assuming that differential spreading of the antenna gain across the beam width can be neglected, the contour of constant antenna gain on the ground plane, denoted 'BDEF' in the figure, will be elliptical in form. Furthermore, the long-side spreading ($\angle$CAD and $\angle$CAB) will be equal, as will the short-side spreading angles ($\angle$CAE and $\angle$CAF). The distances CB, CD, CE, and CF can be easily calculated as $$\frac{CB}{h} = \tan\left(\angle OAC + \left[\begin{array}{c}\text{long-side}\\ \text{spreading-angle}\end{array}\right]\right) - \tan(\angle OAC)$$

$$\frac{CD}{h} = \tan(\angle OAC) - \tan\left(\angle OAC - \left[\begin{array}{c}\text{long-side}\\ \text{spreading-angle}\end{array}\right]\right)$$

$$\frac{CE}{h} = \frac{CF}{h} = \frac{1}{\cos(\angle OAC)}\tan\left(\left[\begin{array}{c}\text{short-side}\\ \text{spreading-angle}\end{array}\right]\right)$$

Assuming the antenna aperture is constant, the spreading angles are then a function of the distance between a user and the projected platform location on the ground (OC). The larger the OC is, the larger the spreading angles are, as shown in FIG. 10.

Figure 10:
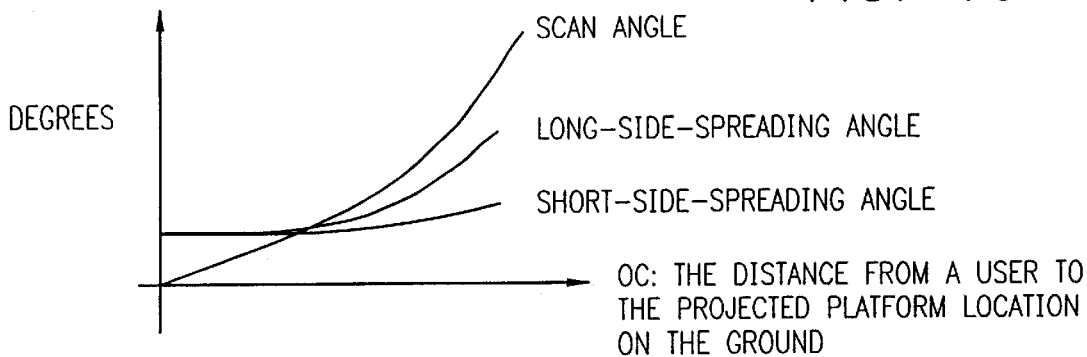
FIG. 10 is a set of graphs showing spreading angle as a function of distance from the projected platform location to a user of an elevated beam projection system.

FIG. 10 is a set of graphs showing spreading angle as a function of distance from the projected platform location to a user of an elevated beam projection system. Note that the short-side spreading angle may be different from the long-side spreading angle.

In practice, optimal utilization of system resources calls for multiple (e.g. 200) beams to be generated. As mentioned above, in the preferred embodiment, each beam would track a user if a user were present. To maximize system capacity, the frequencies are reused by assigning codes to each beam.

In the illustrative implementation, a group of 64 codes is divided into 4 subgroups. Each subgroup of codes is referred to as one color of codes and has 16 individual codes. In the illustrative embodiment, there are four colors of codes. The assignment of one color of codes is independent of the other colors of codes. The same color of codes can be reused outside a criterion. In the illustrative embodiment, a 20 decibel (dB) sidelobe contour criterion is employed. In accordance with this criterion, a beam collision will be detected when the user moves into another cell and receives a signal therein at a level of 20 dB down from maximum or higher. The 20 dB sidelobe contours can be of different sizes and shapes throughout a coverage area.

Figure 11:
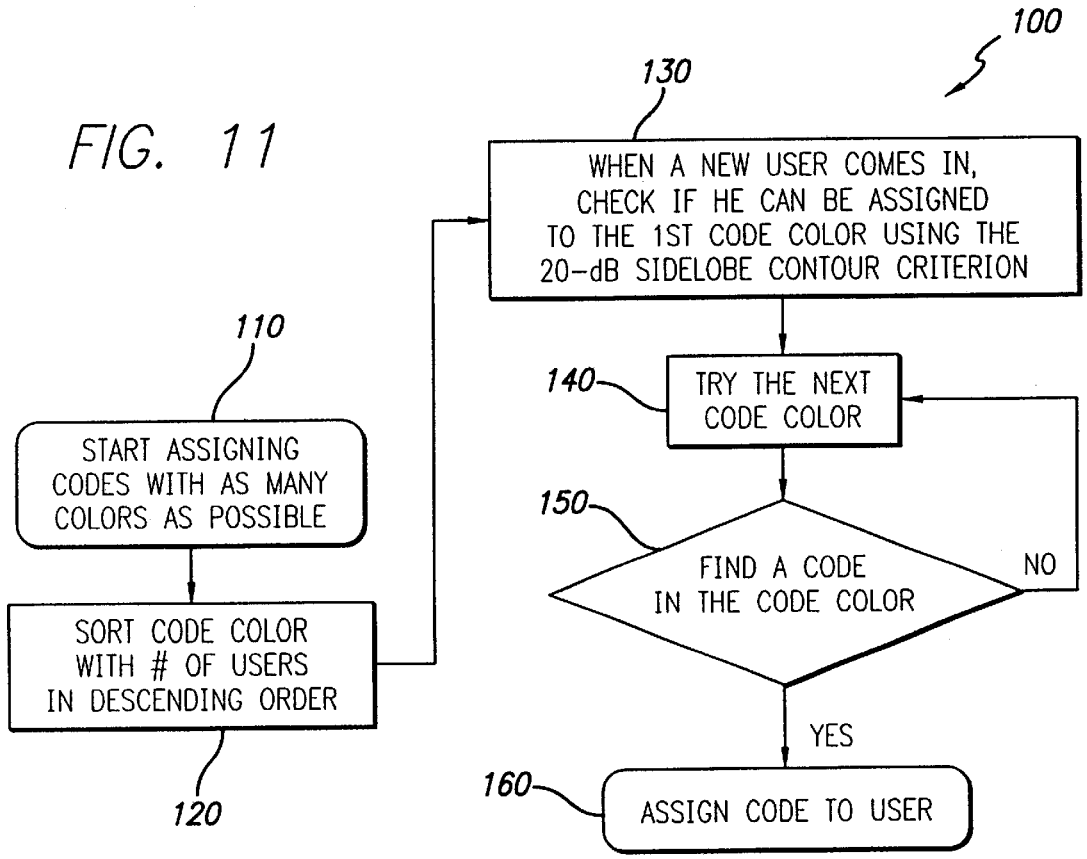
FIG. 11 is a block diagram of an illustrative implementation of a code assignment algorithm for use in connection with the communication system depicted in FIG. 1.

FIG. 11 is a block diagram of an illustrative implementation of a code assignment algorithm for use in connection with the communication system depicted in FIG. 1.

Figure 12:
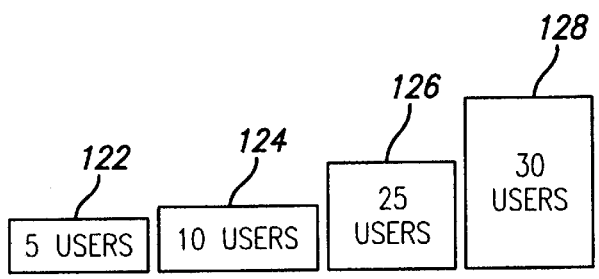
FIG. 12 is a diagram that illustrates color code assignments based on the number of users in accordance with the method of the present invention.

FIG. 12 is a diagram that illustrates color code assignments based on the number of users in accordance with the method of the present invention. The method 100 includes the step of assigning codes with as many colors as possible (110). Next, the code colors are sorted with the number of users in descending order (step 120). Hence, as shown in FIG. 12, purple 122 might be used for 5 users, orange 124 might be used for 10 users, pink 126 might be used for 25 users and blue 128 might be used for 30 users.

Returning to FIG. 11, at step 130, if a new user enters a cell, the system checks to determine if the new user can be assigned to the first code color using the 20 dB sidelobe contour criterion. If not, at step 140, the system 10 tries the next color. At step 150, the system endeavors to find a code in the code color and at step 160, the code is assigned to the user.

Illustrative code assignments are shown in FIGS. 13–17.

Figure 13:
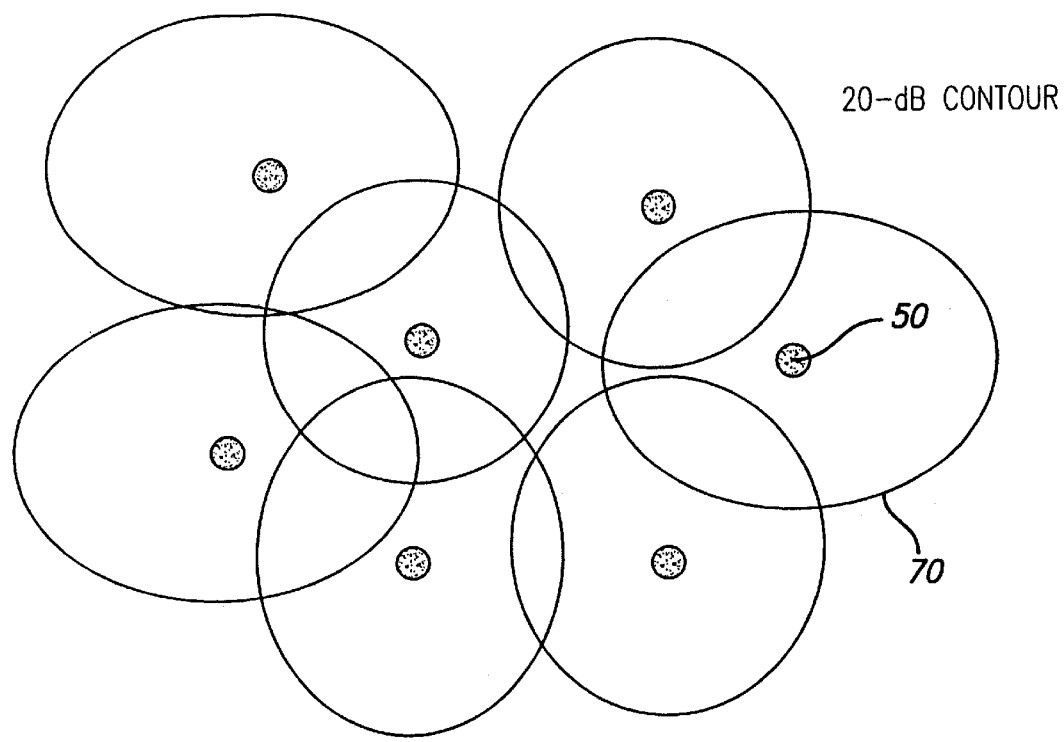
FIG. 13 shows a color 1 code assignment (blue) in accordance with the teachings of the present invention.

FIG. 13 shows a color 1 code assignment (blue) in accordance with the teachings of the present invention.

Figure 14:
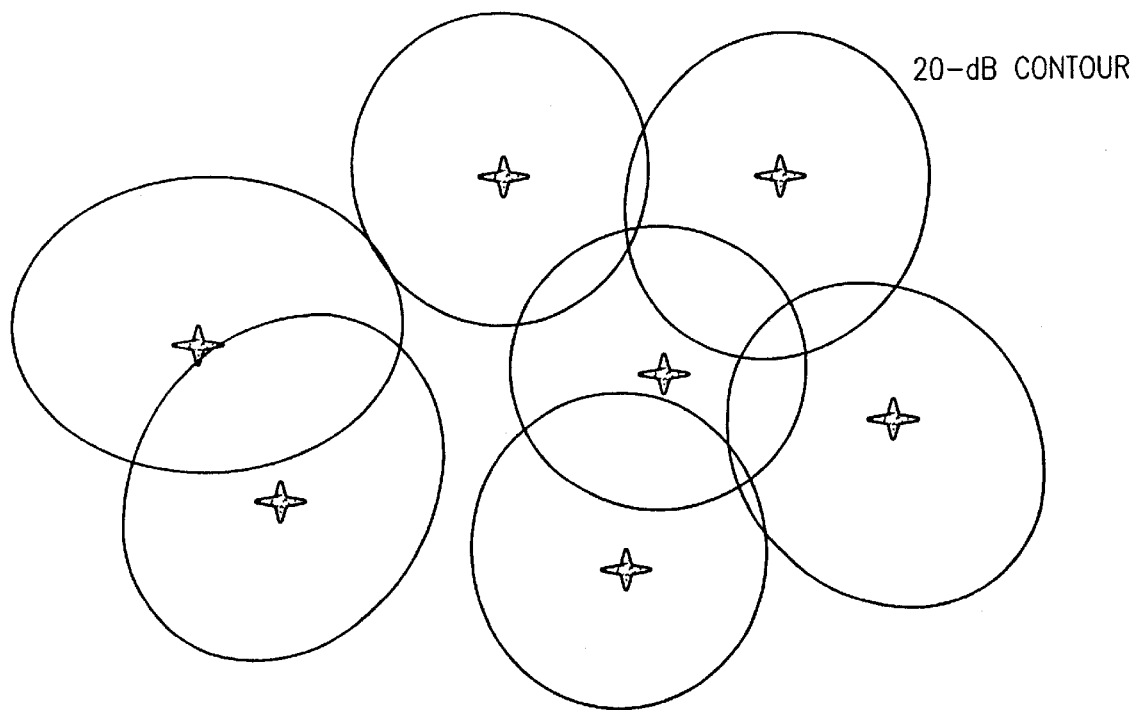
FIG. 14 shows a color 2 code assignment (pink) in accordance with the teachings of the present invention.

FIG. 14 shows a color 2 code assignment (pink) in accordance with the teachings of the present invention.

Figure 15:
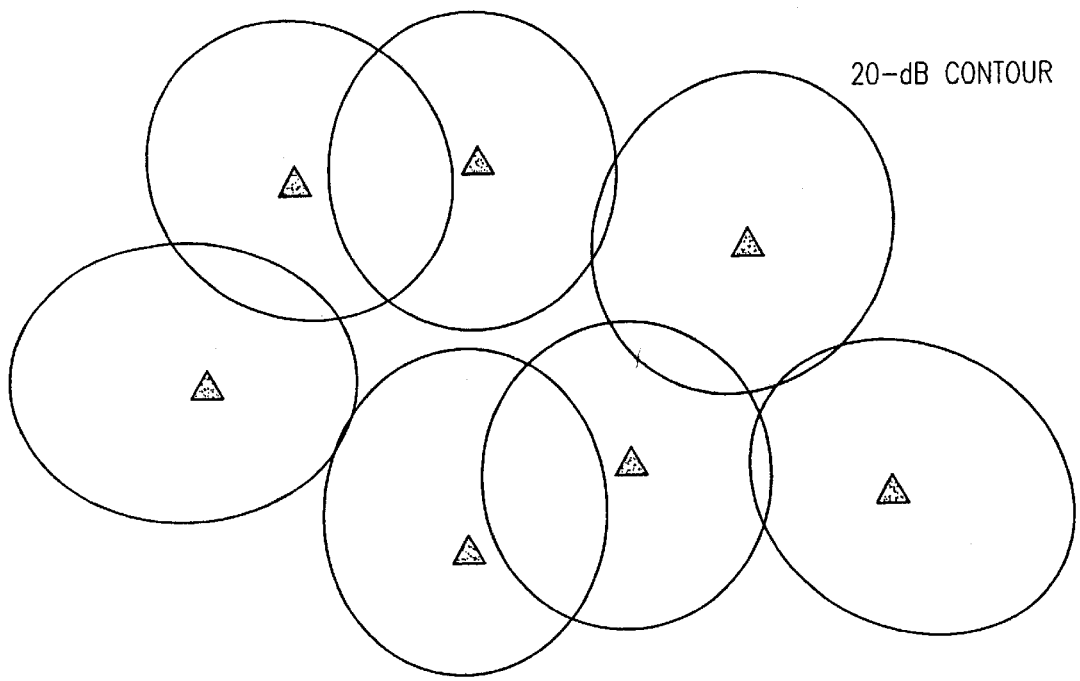
FIG. 15 shows a color 3 code assignment (orange) in accordance with the teachings of the present invention.

FIG. 15 shows a color 3 code assignment (orange) in accordance with the teachings of the present invention.

Figure 16:
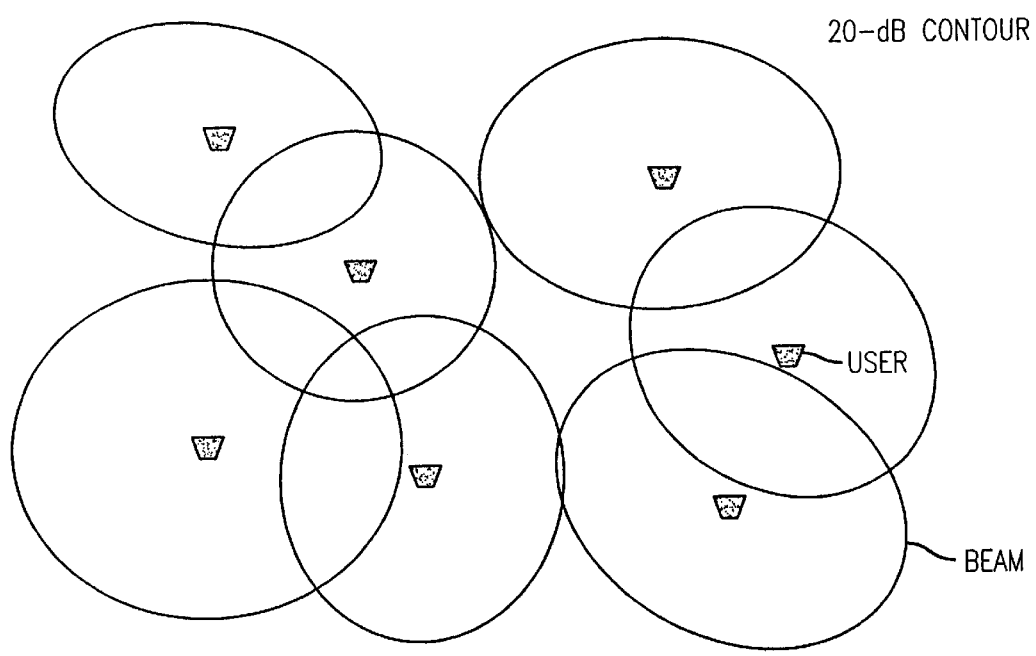
FIG. 16 shows a color 4 code assignment (purple) in accordance with the teachings of the present invention.

FIG. 16 shows a color 4 code assignment (purple) in accordance with the teachings of the present invention.

Figure 17:
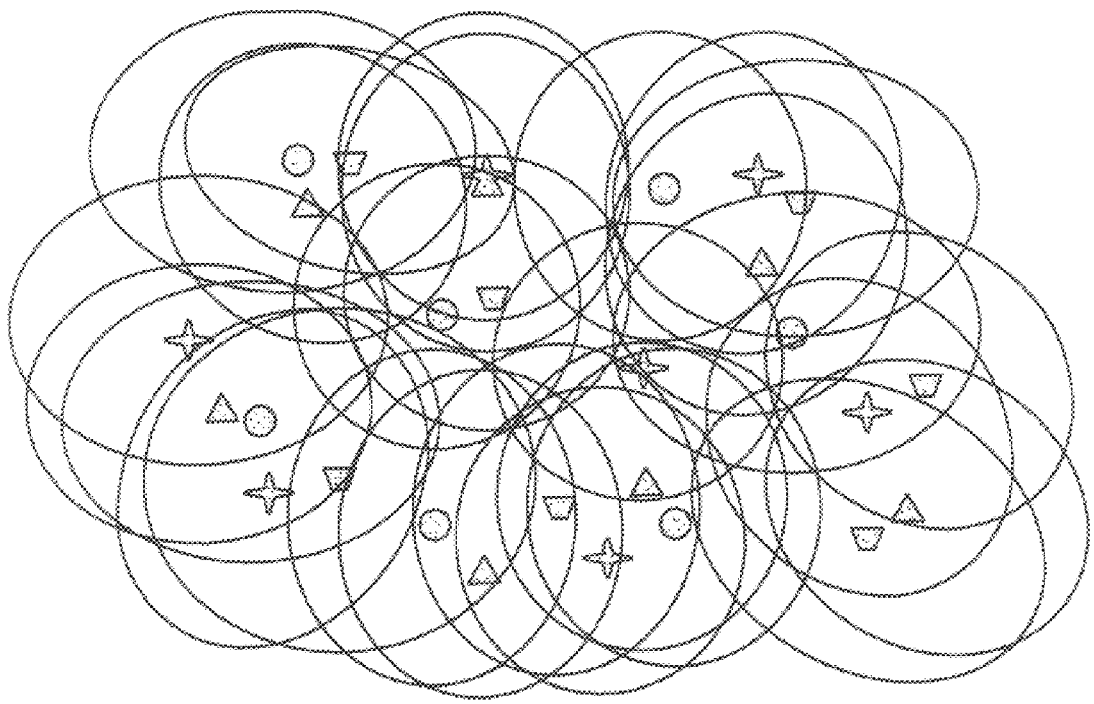
FIG. 17 depicts an overall code assignment.

FIG. 17 depicts an overall code assignment. As shown in FIG. 13, each cell 70 is created by a beam directed to a respective user 50. Note that although the beams overlap, no two beams overlap a user. This is depicted in FIG. 18.

Figure 18:
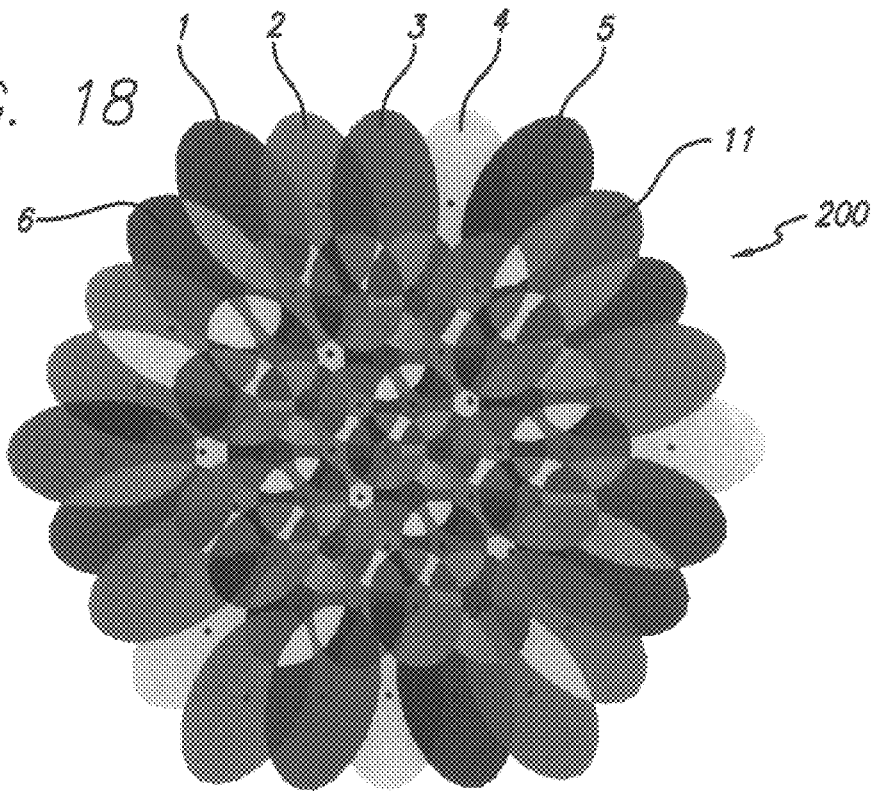
FIG. 18 is a diagram illustrating a distribution of users sharing a code division multiplexed (CDMA) code in accordance with the teachings of the present invention.

FIG. 18 is a diagram illustrating a distribution of users sharing a code division multiplexed (CDMA) code in accordance with the teachings of the present invention. At anytime, a user would not be located inside the contour of another user using the same code. In FIG. 18, the stars are the users. The oval shaped contours are the isolation forbidden zone. That is, any other user using the same code cannot locate inside the forbidden zone. As in the figure, for each oval contour, there is only one user locate in the center of the contour. FIG. 18 shows the code sharing to one of the CDMA codes. For each different code, a similar figure can be drawn.

Returning to FIG. 8, the beamforming processor 38 utilizes the GPS location data in the return signal with respect to the coordinates of the platform and the coordinates of the user to generate beam direction control signals for each user. In accordance with the present teachings, each coverage area or cell, is subdivided into a plurality of microcells. This is depicted in FIG. 19.

Figure 19:
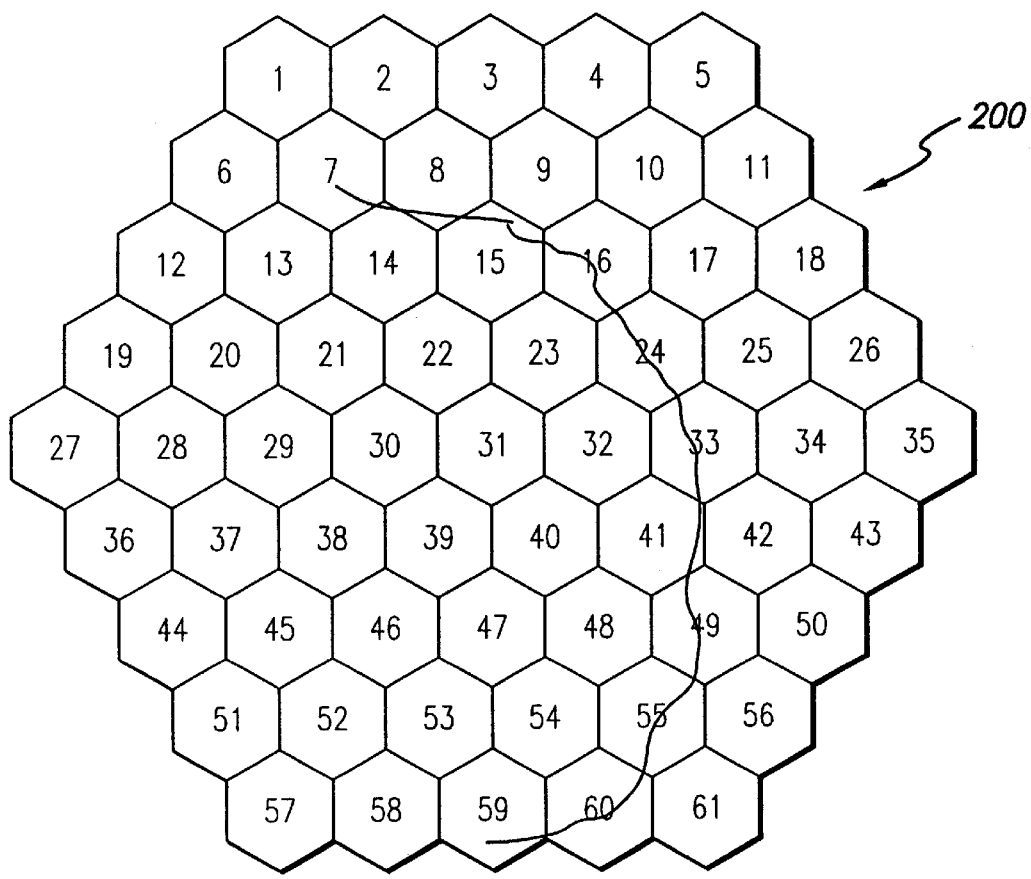
FIG. 19 is a diagram showing an illustrative microcell architecture for use in the mobile user tracking system of the present invention.

FIG. 19 is a diagram showing an illustrative microcell architecture for use in the mobile user tracking system of the present invention. As shown in FIG. 19, the architecture is implemented within a cell 200 as a plurality of microcells #1–61 with precomputed beam weights. In the illustrative embodiment, the microcells correspond to <1 dB antenna directivity roll-off from the peak. The present teachings are not limited to the size and shape of the microcells shown. A variety of shapes and sizes may be used to create uniform or nonuniform patterns without departing from the scope of the present teachings.

In accordance with the present teachings, for a user located at microcell #7 a finite number of beams is formed around the user (e.g. at microcells #1, 2, 6, 7, 8, 13 and 14). So long as the user remains in microcell #7, the beam direction is unchanged. However, if the user moves to microcell #8, then the signal received from microcell #8 will be greater than the signal received from microcell #7. At this point, narrow beams are shifted from microcells #1, 2, 6, 7, 8, 13 and 14 to microcells #2, 3, 7, 8, 9, 14 and 15. In short, in accordance with an illustrative embodiment of the present teachings, a narrow beam is directed to the cell at which the user is located based on strongest return signal, GPS location or other information and to an area surrounding the user defined as microcells in the preferred embodiment. The system continues to track the user as the user travels from microcell #7 to microcell #59 as depicted in FIG. 19.

For mobile users, the beam weights would have to be updated on some basis. For example, assuming a user is moving at a speed under 120 km/hr, and a beam size (with a 4-dB rolloff) of 8 km, the beam weight update rate of approximately once every minute might be adequate. As the user moves along a boundary between microcells, he may be registered with one cell, then another, then back to the original cell. This 'ping-pong' effect may be mitigated by overlapping the cells as depicted in FIG. 20.

Figure 20:
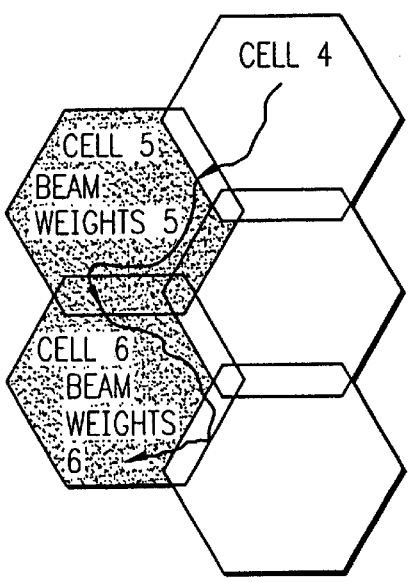
FIG. 20 is a magnified view of a portion of the diagram of FIG. 19 showing overlap between microcells in accordance with the present teachings.

FIG. 20 is a magnified view of a portion of the diagram of FIG. 19 showing overlap between microcells in accordance with the present teachings. With the overlap between adjacent cells, a user will not be assigned to a new microcell immediately when he enters a new microcell's boundary. On the contrary, a new microcell assignment will occur when the user leaves the area of the old cell completely.

Thus, the present invention has been described herein with reference to a particular embodiment for a particular application. The present teachings allow for a very light weight payload with full utilization of the resources that a light-weight payload can offer. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A user tracking system for a wireless communication system comprising:

first means for creating a plurality of beams within a coverage area, a first beam being directed at a user at a first microcell and a number of additional beams illuminating microcells immediately adjacent said first microcell;

second means for detecting movement of said user from said first microcell to one of said immediately adjacent microcells; and third means for redirecting, on the detection of said movement, said first beam from said first microcell to a second microcell, said second microcell being one of said adjacent microcells.

2. The system of claim 1 wherein said first means is a stratospheric platform based communication system including a hub adapted to communicate with a stratospheric platform.

3. The system of claim 2 further including a transceiver and a phased array antenna disposed on said platform.

4. The system of claim 3 further including means disposed at said hub for creating a beamforming signal for use by said phased array antenna.

5. The system of claim 4 wherein said second means is a global positioning system receiver.

6. The system of claim 4 wherein said second means includes means for measuring the strength of a signal received from said user.

7. The system of claim 6 wherein said hub includes said third means.

8. The system of claim 7 wherein said third means includes means responsive to said second means for causing said means for creating a beamforming signal to redirect said first beam.

9. The system of claim 2 wherein said third means includes means for redirecting said additional beams to illuminate microcells immediately adjacent said second microcell on the detection of movement of said user from said first microcell to one of said adjacent microcells.

10. A user tracking system for a wireless stratospheric based communication system comprising:

first means for creating a plurality of beams within a coverage area, a first beam being directed at a user in a first microcell and a number of additional beams illuminating microcells immediately adjacent said first microcell, said first means including a hub adapted to communicate with a stratospheric platform, said platform having a transceiver and a phased array antenna, said hub having means for creating a beamforming signal for use by said phased array antenna;

second means for detecting movement of said user from said first microcell to one of said immediately adjacent microcells; and third means for redirecting, on the detection of said movement, said first beam from said first microcell to a second microcell, said second microcell being one of said adjacent microcells, said third means including means responsive to said second means for causing said means for creating a beamforming signal to redirect said first beam and means for redirecting said additional beams to illuminate microcells immediately adjacent said second microcell on the detection of movement of said user from said first microcell to one of said adjacent microcells.

11. The system of claim 10 wherein said second means is a global positioning system receiver.

12. The system of claim 10 wherein said second means includes means for measuring the strength of a signal received from said user.

13. A method for tracking a user in a wireless communication system comprising the steps of:

creating a plurality of beams within a coverage area, a first beam being directed at a user at a first microcell and a number of additional beams illuminating microcells immediately adjacent said first microcell;

detecting movement of said user from said first microcell to one of said immediately adjacent microcells; and redirecting, on the detection of said movement, said first beam from said first microcell to a second microcell, said second microcell being one of said adjacent microcells.

* * * * *